United States Patent [19]

Suzuki et al.

[11] 4,274,981

[45] Jun. 23, 1981

[54] CATALYST FOR PURIFYING EXHAUST GAS AND THE PROCESS FOR MANUFACTURING THEREOF

[75] Inventors: Yoshihiro Suzuki; Hiroo Kinoshita; Naomi Akasaka, all of Toyota, Japan

[73] Assignee: Toyota Jidosha Kogyo Kabushiki Kaisha, Toyota, Japan

[21] Appl. No.: 109,148

[22] Filed: Jan. 2, 1980

[30] Foreign Application Priority Data

Jul. 6, 1979 [JP] Japan .................................. 54-85670

[51] Int. Cl.³ ........................ B01J 23/10; B01J 23/58; B01J 23/64; B01J 23/89
[52] U.S. Cl. .................................... 252/438; 252/443; 252/455 R; 252/462; 252/465; 252/466 B; 252/466 PT; 423/213.5
[58] Field of Search ................... 252/462, 465, 466 B, 252/466 PT, 438, 443, 455 R; 423/213.5

[56] References Cited

U.S. PATENT DOCUMENTS

| | | | |
|---|---|---|---|
| 3,565,830 | 2/1971 | Keith et al. | 252/473 X |
| 3,741,725 | 6/1973 | Graham | 423/213.5 |
| 3,791,992 | 2/1974 | Feldwick | 252/463 |
| 4,049,582 | 9/1977 | Erickson et al. | 252/465 X |
| 4,171,287 | 10/1979 | Keith | 252/462 |
| 4,171,288 | 10/1979 | Keith et al. | 252/462 |
| 4,183,829 | 1/1980 | Adachi et al. | 252/466 PT |

*Primary Examiner*—W. J. Shine
*Attorney, Agent, or Firm*—Oblon, Fisher, Spivak, McClelland & Maier

[57] ABSTRACT

A catalyst for purifying exhaust gas composed of a catalyst carrier coated with a metal oxide material containing a spinel metal oxide of the formula: $MAl_2O_4$ wherein M is Sr, Mg, Cu, Mn, Mo, Zn, Fe, Co or Ni the metal oxide coated carrier further being coated with rhodium and platinum and/or palladium as catalytically active components. The catalytically active components also can include cerium.

7 Claims, 2 Drawing Figures

CATALYST FOR PURIFYING EXHAUST GAS AND THE PROCESS FOR MANUFACTURING THEREOF

BACKGROUND OF THE INVENTION

1. Field of the Invention

The present invention relates to a catalyst for the high efficiency purification of exhaust gases discharged from an auto internal combustion engine by the removal of such harmful constituents as carbon monoxide (CO), hydrocarbon (HC) and oxides of nitrogen (NOx) from the gases. The invention also relates to a method of preparing the catalyst.

2. Description of the Prior Art

Catalysts which are designed for use in the purification of exhaust gases discharged from an auto internal combustion engine or the like should be highly active over a wide range of temperatures, because the catalysts are used under service conditions in which the chemical reaction-rate determining factors such as the volume and concentration of reactants or the working temperature cannot be maintained constant.

Catalyst formulations in which a catalyst carrier is coated with an active substance and further wherein a catalytic material is supported on said carrier are well known as catalysts suitable for the purification of exhaust gas. Active alumina, principally γ-alumina, has been known to be a particularly effective material as an active thin film having a large surface area for the coating of an underlying catalyst carrier. However, γ-alumina is very likely to suffer changes in crystal structure over long service lives at high temperatures, which results in a decrease of the specific surface area of the catalyst, substantial loss in catalytic activity of the catalyst over periods of time and losses in durability. Moreover, γ-alumina reacts with such catalyst poisons as compounds of lead, sulfur and phosphorus which are present in the discharged gas. Thus, γ-alumina is not always satisfactory in terms of anti-toxicity characteristics. Moreover, for catalysts of a catalytic oxide of a metal such as nickel, iron or mixtures thereof supported on γ-alumina, long service lives at high temperature cause the metal oxides to react with γ-alumina, which results in deterioration of catalyst activity. A need, therefore, continues to exist for an exhaust gas purification catalyst which exhibits stable and efficient activity over long service life.

SUMMARY OF THE INVENTION

Accordingly, one object of the present invention is to provide a catalyst for the highly efficient purification of discharged exhaust gases which functions by removing harmful CO, HC and NOx components from the gases.

Another object of the present invention is to provide a method of manufacturing an efficient exhaust gas purification catalyst.

Still another object of the present invention is to provide a catalyst which maintains an excellent performance level while purifying and freeing discharged exhaust gases of three harmful components without suffering loss in catalytic activity even over long term service life at high temperatures.

Briefly, these and other objects of the present invention as hereinafter will become more readily apparent can be attained by a catalyst for purifying exhaust gas which is composed of a catalyst carrier coated with a metal oxide material containing a spinel metal oxide of the formula: $MAl_2O_4$ wherein M is Sr, Mg, Cu, Mn, Mo, Zn, Fe, Co or Ni, the metal oxide coated carrier further being coated with Rh and Pt and/or Pd as the catalytically active components. In another embodiment of the catalyst, the catalytically active components can also include cerium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
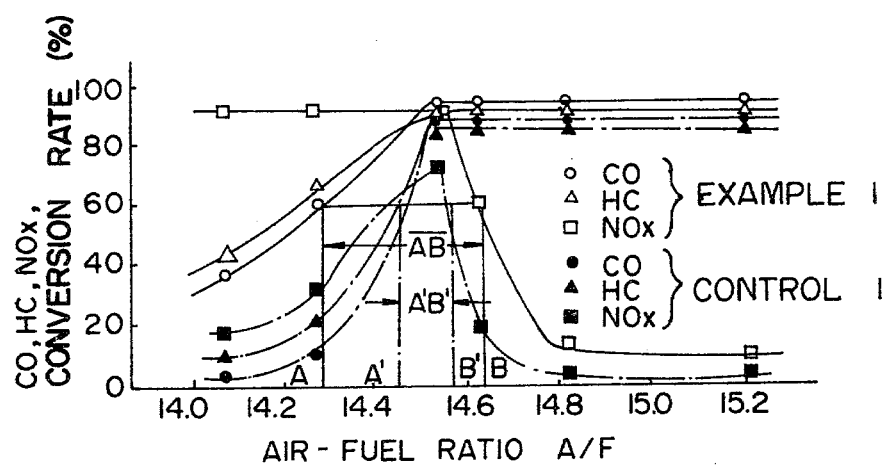
FIG. 1 is a diagram showing the purification performances of the catalysts obtained in Example 1 and Control Example 1.

The catalyst of the present invention can be prepared by the following method.

Distilled water and if need be, 0.1–10 weight % of aluminum nitrate $Al(NO_3)_3 \cdot 9H_2O$ are added to and mixed with alumina sol containing 5–20 weight % of alumina which is stabilized by an inorganic or organic acid. To the resulting alumina sol, a finely powdered metal oxide of the formula $MAl_2O_4$ which has a spinel structure, wherein M is Sr, Mg, Cu, Mn, Mo, Zn, Fe, Co or Ni and which has been preliminarily treated with an inorganic or organic acid is added and a spinel slurry containing 20–60 weight % of the spinel oxide is prepared. The metal oxide spinel, $MAl_2O_4$, which is added to the alumina sol, can be obtained by an ordinary method, for example, by mixing a powdered oxide of a metal M with an alumina powder and then heating and calcining the mixture at 1200°–1600° C. The resultant material is ground to a powder. In use, the starting metal oxide, MO, powder and the alumina powder desirably have an average particle size diameter of 0.5–25μ. If the average particle size of the powders is less than 0.5μ or more than 25μ, the strength of the film formed by coating the surface of a carrier with the spinel powder is inferior and undesirable.

The finely powdered metal oxide spinel thus prepared is washed with a suitable inorganic acid such as nitric acid or hydrochloric acid or with an organic acid such as acetic acid, is further washed with distilled water, and then dried and calcined to yield the finely powdered metal oxide spinel product. The purpose of the washing treatment is to adjust the "water immersion pH value" of 10–11 of the metal oxide powder before the washing treatment to a pH value of 7–9.

The "water immersion pH value" mentioned here means the pH value of the suspension obtained by suspending the powder in an amount of distilled water 1.5 times the weight of the powder and agitating the suspension for 20–30 minutes. A "water immersion pH" of 7–9 implies that the powder in an aqueous solution is nearly neutral.

When a slurry of the alumina sol stabilized with an inorganic or organic acid is prepared using a spinel metal oxide powder which has not been washed, the viscosity of the spinel slurry is not stable because of the basic property of the fine powder, and the film of the spinel metal oxide formed on the carrier surface is not uniform. For this reason, the water immersion pH value of the spinel metal oxide used in the present invention is required to be adjusted to a value of 7-9. When aluminum nitrate is added to the slurry thus obtained, it is possible to properly adjust the viscosity of the slurry and at the same time improve the adherence of the film of the spinel metal oxide to the carrier.

In the preparation of the catalyst, a carrier, particularly a monolithic carrier, is immersed in the spinel slurry obtained, and then is removed from the slurry. Residual slurry is conveniently removed from the pores of the carrier by an air stream blast thereby leaving a carrier coated with a spinel slurry on its surface. The coated carrier is dried at room temperature to 150° C. and calcined at 300°-1400° C., desirably at 400°-800° C. The process of immersion, drying and calcination may be repeated more than two times until the desired thickness of the spinel film is attained. Preferably, the film coating applied to the carrier contains more than 90 weight % of spinel oxide and less tha 10 weight % alumina.

Catalyst formulation can be completed by immersing the coated carrier in a solution containing Rh or a solution containing Rh and then a solution containing Ce, and then further in a solution containing Pt and/or Pd, followed by drying and calcining the treated carrier in an inert atmosphere such as nitrogen gas or in a reducing atmosphere such as hydrogen gas.

Suitable carrier substrates which can be used in the present invention inclucde the granular, monolithic and the like Especially suitable materials for monolithic carriers ae cordierite, mullite, α-alumina, magnesia, zirconia, silicon carbide, silicon nitride and the like.

The alumina sol of 5-20 weight % concentration which is used in the preparative technique of the present invention can be an amorphous fibrous colloidal alumina obtained by, for example, the process disclosed in Japanese Patent Publication No. Sho 40-3658, which has been stabilized with an inorganic or organic acid. Suitable organic acids for stabilization include acetic acid, formic acid, lactic acid, butyric acid and the like. Suitable inorganic acids such as nitric acid, hydrochloric acid and the like or mixtures thereof can be employed for stabilization of the sol.

The appropriate catalytic substances and the amounts of the same supported on the carrier are as follows: Ce-0.01-2.0 mol/l, preferably 0.1-0.6 mol/l; Rh-0.01-0.3 g/l, preferably 0.05-0.20 g/l; Pt or Pd-each 0.05-5.0 g/l, preferably 0.5-3.0 g/l with the total amount of Rh, Pt and Pd being 0.1-5.0 g/l, preferably 0.5-3.0 g/l.

With regard to the supported catalyst product of the invention, desirably the metal oxide spinel amounts to more than 90% by weight of the total coating while the oxide of metal M amounts to less than 10% by weight thereof.

Having generally described this invention, a further understanding can be obtained by reference to certain specific examples which are provided herein for purposes of illustration only and are not intended to be limiting unless otherwise specified.

EXAMPLE 1

In a small V-form mixer, 300 g of nickel oxide with an average particle size of 4μ and 410 g of alumina with an average particle size of 10μ were mixed and the mixture was placed in a crucible for calcination in an electric furnace at 1400° C. for 20 hours. After the calcined material was cooled, it was washed with 1 l of a 0.1 N solution of nitric acid, followed by washing with 2 l of distilled water. Then, the washed product was calcined at 300° C. for 12 hours. The calcined product was dry-crushed in a ball mill made of alumina, yielding a spinel metal oxide power of an average particle size of 6μ. Next, 250 g of distilled water was added to 300 g of alumina sol containing 10 weight % of alumina which had been stabilized with acetic acid, to which 45 g of Al(NO$_3$)$_3$.9 H$_2$O was added, yielding a mixed solution. To this solution was added 500 g of the spinel metal oxide, NiAl$_2$O$_4$, having an average particle size of 6μ, to prepare a spinel slurry, the viscosity of said slurry being 250 cps. A monolithic carrier of cordierite (a cylinder 93 mm in diameter and 76 mm in length) was immersed into the spinel slurry for 120 seconds, lifted out of the slurry and blasted with a stream of air to displace residual slurry from the pores of the carrier, dried at 150° C. for 3 hours and then calcined at 600° C. for 3 hours. The coated amount of material was 50 g and the content of NiAl$_2$O$_4$ in the coating was 93% and that of alumina was 7%.

The obtained carrier was immersed in 500 cc of an aqueous solution of rhodium chloride (containing 0.07 g of Rh) at room temperature for 30 minutes. After removal of the carrier from the solution residual drops of the solution in the pores of the carrier were removed by a blast of air and the treated carrier was dried at 150° C. for 3 hours and then calcined at 500° C. for 2 hours. The carrier coated with Rh was also immersed in 500 cc of an aqueous solution of chloroplatinic acid (containing 1.4 g of Pt) for 30 minutes. After removing the carrier from the solution and the drops of the solution in the pores of the carrier were removed by a blast of air, the carrier was rapidly dried by hot air and reduced and fired in a nitrogen atmosphere containing 5% of hydrogen at 500° C. for 3 hours. The amounts of Rh and Pt supported on the carrier were 0.04 g and 0.72 g respectively.

EXAMPLE 2

In a small V-form mixer, 160 g of magnesium oxide with an average particle size of 4μ and 410 g of alumina with an average particle size of 10μ were mixed and the mixture was placed in a crucible and calcined in an electric furnace at 1400° C. for 20 hours. In the same way as in Example 1, the calcined spinel product was washed with nitric acid and a slurry prepared from the spinel oxide was coated on a monolithic carrier. The amount of slurry coated on the monolithic carrier was 50 g with the content of MgAl$_2$O$_4$ in the coating being 93% and that of alumina being 7%. The obtained carrier was immersed in 500 cc of an aqueous solution of rhodium chloride (Rh content 0.05 g) for 30 minutes. After removal of the carrier from solution, residual drops of solution in the pores of the carrier were removed by a blast of air. The carrier was dried at 150° C. for 3 hours and then calcined at 500° C. for 2 hours.

After cooling, the Rh-carrying carrier was immersed at room temperature into 500 cc of an aqueous solution of palladium nitrate (Pd content 1.28 g) for 30 minutes. After removal from solution, residual drops of the solution in the pores of the carrier were removed by a blast of air and the carrier was dried at 150° C. for 3 hours, and calcined at 500° C. for 2 hours. The carrier coated with Rh and Pd was immersed in 500 cc of an aqueous solution of chloroplatinic acid (containing 0.44 g of Pt) at room temperature for 30 minutes. After removing the carrier from the solution and the drops of the solution in the pores of the carrier were removed by a blast of air, the carrier was rapidly dried in a hot draft at 150° C., reduced in a nitrogen atmosphere containing 5% hydrogen at 500° C. for 3 hours and thereafter calcined at 500° C. for 2 hours. The amounts of Rh, Pd and Pt supported on the carrier were 0.03 g, 0.22 g and 0.51 g respectively.

EXAMPLE 3

In a small V-form mixer, 330 g of iron oxide with an average particle size of 3μ and 410 g of alumina with an average particle size of 10μ were mixed and the mixture was placed in a crucible and calcined in an electric furnace at 1400° C. for 20 hours. In the same way as in Example 1, the calcined spinel product was treated with acetic acid. A slurry was prepared from the calcined spinel and coated on a monolithic carrier. The amount of coated material on the monolithic carrier was 50 g. The content of $FeAl_2O_4$ in the coating was 93% and that of alumina was 7%. The obtained carrier was immersed into 500° cc of an aqueous solution of rhodium chloride (containing 0.08 g of Rh) for 30 minutes. After removal of the carrier from the solution, residual drops of the solution in the pores of the carrier were removed by a blast of air. The carrier was dried at 150° C. for 3 hours and then calcined at 500° C. for 2 hours.

After cooling, the carrier on which rhodium was supported was immersed into 500 cc of an aqueous solution of palladium chloride (containing 1.78 g of Pd) for 30 minutes. After removal of the carrier from the solution, residual drops of the solution were removed by a blast of air. The carrier was then dried at 150° C. for 3 hours and calcined at 500° C. for 2 hours. The amounts of Rh and Pd supported on the carrier were 0.05 g and 0.71 g respectively.

EXAMPLE 4

By a method similar to Example 2, $MgAl_2O_4$ powder treated with nitric acid was prepared. Next, 300 g of distilled water was added to 360 g of alumina sol containing 10 weight % of alumina which was stabilized with hydrochloric acid and the resultant material was mixed with 54 g of $Al(NO_3)_3.9H_2O$ yielding a mixed solution. To this solution was added 360 g of said spinel metal oxide powder having an average particle size of 6μ, yielding a spinel slurry having a viscosity of 200 cps.

Into this slurry a cylindrical monolithic carrier of cordierite (93 mm in diameter; 76 mm in length) was immersed for 120 seconds. After removal of the carrier from the slurry, residual slurry in the pores of the carrier was removed by a blast of air. The carrier was dried at 150° C. for 3 hours and calcined at 600° C. for 3 hours. The coated amount of material on the carrier was 40 g with 88% by weight being $MgAl_2O_4$ and 12% by weight being alumina. By an operation similar to that in Example 2, Rh, Pt and Pd were supported on the carrier. The amounts of Rh, Pd and Pt supported on the carrier were 0.03 g, 0.23 g and 0.50 g respectively.

EXAMPLE 5

In a small V-form mixer, 330 g of zinc oxide with an average particle size of 4μ and 410 g of alumina with an average particle size of 10μ were mixed and the mixture was placed in a crucible and calcined at 1400° C. in an electric furnace for 20 hours. After cooling, the calcined product was treated with 1 l of a 0.1 N solution and nitric acid, followed by washing with 2 l of distilled water. The product was then calcined at 300° C. for 12 hours and drycrushed by means of a ball mill made of alumina to yield a powder of a spinel metal oxide having an average particle size of 6μ. Next, 250 g of distilled water was added to 300 g of alumina sol containing 10% by weight of alumina stabilized with acetic acid and further 45 g of aluminum nitrate was added thereto and mixed with the aqueous mixture. To the mixed solution was added 500 g of the metal oxide, $ZnAl_2O_4$, having a spinel slurry having a viscosity of 250 cps. A cylindrical monolithic carrier (93 mm in diameter; 76 mm in length) was immersed in the thus obtained slurry for 120 seconds. After removal of the carrier from the slurry, residual drops of the solution in the pores of the carrier were removed by a blast of air. Then, the carrier was dried at 150° C. for 3 hours and calcined at 600° C. for 3 hours. The carried amount was 50 g, the content of $ZnAl_2O_4$ being 93% and that of alumina being 7%.

The obtained carrier was immersed in 500 cc of an aqueous solution of cerium nitrate (containing Ce 1.8 mols) for 30 minutes. After removal of the carrier from the slurry, residual drops of the slurry in the pores of the carrier were removed by a blast of air. Then the carrier was dried at 150° C. for 3 hours and calcined at 500° C. for 2 hours. The carrier on which Ce was supported was immersed in 500 cc of a solution containing rhodium chloride (containing 0.07 g of Rh) for 30 minutes. After removal of residual drops of solution from the pores of the carrier, the carrier was dried at 150° C. for 3 hours and calcined at 500° C. for 2 hours. The carrier supporting Ce and Rh was immersed in 500 cc of an aqueous solution of chloroplatinic acid (containing 1.5 g of Pt) for 30 minutes. After removal of the carrier from the solution, residual drops of the solution in the pores of the carrier were removed by a blast of air. The carrier was rapidly dried by a hot air blast and reduced and calcined in a nitrogen atmosphere containing 5% hydrogen at 500° C. for 3 hours, and then calcined at 500° C. for 2 hours. The supported amounts of Ce, Rh and Pt were 0.1 mol, 0.04 g and 0.76 g respectively.

EXAMPLE 6

In a small V-form mixer, 160 g of magnesium oxide with an average particle size of 4μ and 410 g of alumina with an average particle size of 10μ were mixed and the mixture was placed in a crucible and calcined in an electric furnace at 1400° C. for 20 hours. The calcined product was teated with nitric acid in the same way as in Example 5 to prepare a slurry. A monolithic carrier was coated with this slurry. The amount of the coating was 50 g and the contents of $MgAl_2O_4$ and alumina in the coating were 93% and 7% respectively. The carrier was immersed in 500 cc of an aqueous solution of cerium nitrate (containing Ce 1.8 mol) for 30 minutes.

After removal from solution and after removal of residual drops of solution from the pores of the carrier by air blasting, the carrier was dried at 150° C. for 3 hours and calcined at 500° C. for 2 hours. The carrier supporting Ce thus obtained was immersed in 500 cc of an aqueous solution of rhodium chloride (containing 0.05 g of Rh) for 30 minutes. After removal from solution and removal of residual drops of solution by blasting with air, the catalyst was dried at 150° C. for 3 hours and calcined at 500° C. for 2 hours. The carrier supporting Ce and Rh was immersed in 500 cc of a mixed solution of chloroplatinic acid and palladium chloride (containing 1.0 g of Pt and 0.45 g of Pd) for 30 minutes. After removal from solution and removal of residual drops of solution with a blast of air, the catalyst was rapidly dried in a hot draft at 150° C. and reduced and calcined in a nitrogen atmosphere containing 5% hydrogen at 500° C. for 3 hours, and then calcined at 500° C. for 2 hours. The amounts of Ce, Rh, Pt and Pd supported were 0.1 mol, 0.03 g, 0.51 g and 0.22 g respectively.

EXAMPLE 7

In a small V-form mixer, 415 g of strontium oxide powder with an average particle size of $3\mu$ and 410 g of alumina with an average particle size of $10\mu$ were mixed. The mixture was placed into a crucible and fired at 1400° C. in an electric furnace for 20 hours. As in Example 5, the fired product was washed with an aqueous solution of acetic acid and a slurry was prepared from it. Upon the coating of a monolithic carrier with the slurry, the coated amount on the carrier was 50 g with the contents of $SrAl_2O_4$ and alumina in the coating being 93% and 7% respectively.

The carrier was then immersed in 500 cc of a solution of cerium nitrate (containing 1.8 mol of Ce) for 30 minutes. After removal from solution and removal of residual drops of solution from the carrier by air blasting, the carrier was dried at 150° C. for 3 hours and then fired at 500° C. for 2 hours. The carrier supporting Ce was immersed in 500 cc of an aqueous solution of rhodium chloride (containing 0.12 g of Rh) for 30 minutes. After removal from solution and removal of residual drops of solution from the carrier by air blasting, the carrier was dried at 150° C. for 3 hours and fired at 500° C. for 2 hours. The carrier supporting Ce and Rh was immersed in 500 cc of an aqueous solution of chloroplatinic acid (containing 1.38 g of Pt) at room temperature for 30 minutes. After removal from solution and removal of residual drops of solution from the carrier by air blasting, the carrier was rapidly dried in a hot draft of 150° C., reduced and fired in a nitrogen atmosphere containing 5% hydrogen at 500° C. for 3 hours, and then calcined at 500° C. for 2 hours. The supported amounts of Ce, Pt and Rh were 0.1 mol, 0.69 g and 0.07 g respectively.

EXAMPLE 8

$MgAl_2O_4$ powder treated with nitric acid in the same manner as in Example 6 was prepared.

Next, 300 g of distilled water was added to 360 g of alumina sol containing 10 weight % of alumina stabilized with hydrochloric acid and then 54 g of aluminum nitrate was added thereto to yield a mixed solution. A 360 g amount of the above spinel metal oxide powder with an average particle size of $6\mu$ was added to the solution to yield a spinel slurry, the viscosity thereof being 200 cps.

A cylindrical monolithic carrier of cordierite (93 mm in diameter; 76 mm in length) was immersed in this slurry for 120 seconds. After removal of the carrier from the slurry and removal of residual drops of solution from the pores of the carrier by a blast of air, the carrier was dried at 150° C. for 3 hours and fired at 600° C. for 3 hours. The coated amount of material on the carrier was 40 g with the content of the material being $MgAl_2O_4$ and alumina in amounts of 88% and 12% respectively. The carrier was immersed in 500 cc of an aqueous solution of cerium nitrate (containing 1.8 mol of Ce) for 30 minutes. After removal of the carrier from solution and removal of residual drops of solution from the pores of the carrier by a blast of air, the carrier was dried at 150° C. for 3 hours and fired at 500° C. for 2 hours. Said carrier supporting Ce ws immersed in 500 cc of an aqueous solution of palladium nitrate (containing 1.78 g of Pd) for 30 minutes. After removal from solution and removal of residual solution from the carrier by a blast of air, the carrier was dried at 150° C. for 3 hours and fired at 500° C. for 2 hours. The carrier supporting Ce and Pd was immersed in 500 cc of an aqueous solution of rhodium chloride (containing 0.08 g of Rh) at room temperature for 30 minutes. After removal from solution and removal of residual drops of solution, the carrier was dried at 150° C. for 3 hours and calcined at 500° C. for 2 hours. The supported amounts of Ce, Rh and Pd on the carrier were 0.1 mol, 0.05 g and 0.71 g, respectively.

EXAMPLE 9

In a small V-form mixer, 320 g of copper oxide (CuO) with an average particle size of $3\mu$ and 410 g of alumina with an average particle size of $10\mu$ were mixed. The mixture was placed in a crucible and fired at 1400° C. in an electric furnace for 20 hours. Thus fired product was treated with nitric acid in the same manner as described in Example 1 and a slurry was prepared from the calcined product. A monolithic carrier was coated with this slurry. The coated amount of material on the carrier was 50 g with the contents of $CuAl_2O_4$ and alumina in the coating being 93% and 7% respectively. The carrier was immersed in 500 cc of an aqueous solution of cerium nitrate (containing 1.8 mol of Ce) for 30 minutes. After removal from solution and removal of residual drops of solution from the carrier, the carrier was dried at 150° C. for 3 hours and fired at 500° C. for 2 hours. The carrier supporting Ce was immersed in an aqueous solution of rhodium chloride (containing 0.05 g of Rh) for 30 minutes. The carrier was dried at 150° C. for 3 hours and fired at 500° C. for 2 hours. The carrier supporting Ce and Rh was immersed in 500 cc of the mixed solution of chloroplatinic acid and palladium chloride (containing 1.0 g of Pt and 0.45 g of Pd) for 30 minutes. After removal from solution and removal of residual drops of solution from the pores of the carrier by a blast of air, the carrier was dried rapidly in an air blast of 150° C. and reduced and fired in a nitrogen atmosphere containing 5% of hydrogen at 500° C. for 3 hours, and fired at 500° C. in the air for 2 hours. The supported amounts of Ce, Rh, Pt and Pd on the carrier were 0.1 mol, 0.03 g, 0.51 g and 0.22 g respectively.

EXAMPLE 10

Using 290 g of manganese oxide (MnO) with an average particle size of $5\mu$, a monolithic carrier was coated with $MnAl_2O_4$ in the same way as described in Example 9. The carrier was then treated as in Example 9. The supported amounts of Ce, Rh, Pt and Pd were 0.1 mol, 0.03 g, 0.50 g and 0.21 g respectively.

EXAMPLE 11

Using 520 g of molybdenum oxide ($MoO_2$) with an average particle size of $5\mu$, a monolithic carrier was coated with $MoAl_2O_4$ in the same way as described in Example 9. The carrier was then treated as described in Example 9 thereby supporting Ce, Rh, Pt and Pd thereon. The supported amounts of Ce, Rh, Pt and Pd were 0.1 mol, 0.03 g, 0.53 g and 0.20 g, respectively.

EXAMPLE 12

Using 300 g of cobalt oxide (CoO) with an average particle size of 4μ, a monolithic carrier was coated with $CoAl_2O_4$ in the same way as described in Example 9. The carrier was treated as described in Example 9. The supported amounts of Ce, Rh, Pt and Pd were 0.1 mol, 0.03 g, 0.51 g and 0.20 g, respectively.

Control Example 1

A 250 g amount of distilled water was added to 300 g of acetic acid-stabilized alumina sol containing 10 weight % of alumina, followed by successive addition of 45 g of $Al(NO_3)_3.9H_2O$ and 500 g of γ-alumina of an average particle size of 10μ, thereby preparing a slurry, the viscosity of which was 200 cps. A cylindrical monolithic carrier of cordierite (93 mm in diameter; 76 mm in length) was immersed in this slurry for 120 seconds. After removal from solution and removal of residual drops of solution from the carrier by a blast of air, the carrier was dried at 150° C. for 3 hours and calcined at 600° C. for 3 hours. The coated amount of alumina was 50 g. The carrier was then immersed in 500 cc of an aqueous solution of rhodium chloride (containing 0.05 g of Rh) for 30 minutes. After removal from solution and removal of residual drops of solution from the carrier by a blast of air, the carrier was dried at 150° C. for 3 hours and fired at 500° C. for 2 hours. The carrier supporting Rh was immersed in 500 cc of an aqueous solution of chloroplatinic acid (containing 0.9 g of Pt) for 30 minutes. After removal from solution and removal of residual solution from the pores of the carrier by a blast of air, the carrier was rapidly dried in a hot draft of 150° C. and calcined in a nitrogen atmosphere containing 5% hydrogen at 500° C. for 3 hours. The supported amounts of Rh and Pt were 0.04 g and 0.72 g respectively.

Control Example 2

In the same way as described in Control Example 1, an alumina film was formed on a monolithic carrier of cordierite, the amount of alumina therein being 50 g. The coated carrier was immersed in 500 cc of an aqueous solution of rhodium chloride (containing 0.04 g of Rh) for 30 minutes. After removal from solution and removal of residual drops of solution from the carrier by a blast of air, said carrier was dried at 150° C. for 3 hours and calcined at 500° C. for 2 hours. The carrier supporting Rh was immersed in 500 cc of an aqueous solution of palladium nitrate (containing 0.28 g of Pd) for 30 minutes. After removal from solution and removal of residual drops of solution from the carrier by a blast of air, the carrier was dried at 150° C. for 3 hours and calcined at 500° C. for 3 hours. The carrier supporting Rh and Pd was immersed in 500 cc of an aqueous solution of chloroplatinic acid (containing 0.64 g of Pt) for 30 minutes. After removal from solution and removal of residual drops of solution from the carrier by a blast of air, the carrier was rapidly dried in a hot draft of 150° C., reduced in a nitrogen atmosphere containing 5% hydrogen at 500° C. for 3 hours, and then calcined at 500° C. for 2 hours. The supported amounts of Rh, Pd and Pt were 0.03 g, 0.22 g and 0.51 g, respectively.

Control Example 3

In the same way as described in Control Example 1, a monolithic carrier of cordierite was coated with an alumina film. The coated amount of alumina was 50 g. This carrier was immersed in 500 cc of an aqueous solution of ferrous nitrate (containing 1.0 mol of Fe) for 30 minutes. After removal from the solution and removal of residual drops of solution from the pores of the carrier by a blast of air, the carrier was dried at 150° C. for 3 hours and calcined at 500° C. for 2 hours. The carrier supporting Fe was immersed in 500 cc of an aqueous solution of rhodium chloride (containing 0.06 g of Rh) for 30 minutes. After removal from solution and removal of residual solution from the carrier by a blast of air, the carrier was dried at 150° C. for 3 hours and calcined at 500° C. for 2 hours. The carrier supporting Fe and Rh was immersed in 500 cc of an aqueous solution of palladium nitrate (containing 0.90 g of Pd) for 30 minutes. After removal from solution and removal of residual drops of solution from the pores of the carrier by a blast of air, the carrier was dried at 150° C. for 3 hours and calcined at 500° C. for 2 hours. The supported amounts of Fe, Rh and Pt were 0.1 mol, 0.05 g and 0.71 g, respectively.

Control Example 4

A 250 g amount of distilled water was added to 300 g of acetic acid-stabilized alumina sol containing 10 weight % alumina, followed by successive addition of 45 g of $Al(NO_3)_3.9H_2O$ and 500 g of γ-alumina of an average particle size of 10μ, to prepare a slurry, the viscosity of said slurry being 200 cps. A cylindrical monolithic carrier of cordierite (93 mm in diameter; 76 mm in length) was immersed in this slurry for 120 seconds. After removal from solution and removal of residual drops of solution from the pores of the carrier by air blasting, the carrier was dried at 150° C. for 3 hours and calcined at 600° C. for 3 hours. The coated amount of alumina was 50 g. The carrier was then immersed in 500 cc of an aqueous solution of cerium nitrate (containing 1.0 mol of Ce) for 30 minutes. After removal from solution and removal of residual drops of solution from the carrier by a blast of air, the carrier was dried at 150° C. for 3 hours and calcined at 500° C. for 2 hours. The carrier supporting Ce was immersed in 500 cc of an aqueous solution of rhodium chloride (containing 1.28 g of Rh) for 30 minutes. After removal from solution and removal of residual drops of solution from the pores of the carrier by a blast of air, the carrier was dried at 150° C. for 3 hours and fired at 500° C. for 2 hours. The carrier carrying Ce and Rh was immersed in 500 cc of an aqueous solution of chloroplatinic acid (containing 0.86 g of Pt) for 30 minutes. After removal from solution and removal of residual solution by a blast of air, the carrier was rapidly dried in a hot draft of 150° C. and then calcined in a reducing atmosphere of nitrogen containing 5% hydrogen at 500° C. for 3 hours and calcined at 500° C. for 2 hours. The supported amounts of Ce, Rh and Pt were 0.1 mol, 0.10 g and 0.69 g, respectively.

Control Example 5

In the same way as described in Control Example 4, a monolithic carrier of cordierite was coated with an alumina film, the amount of which was 50 g. This carrier was immersed in 500 cc of an aqueous solution of cerium nitrate (containing 1.0 mol of Ce) for 30 minutes. After removal from solution and removal of residual solution from the carrier by a blast of air, the carrier was dried at 150° C. for 3 hours and then calcined at 500° C. for 2 hours. The carrier supporting Ce was immersed in 500 cc of an aqueous solution of rhodium chloride (containing 1.28 g of Rh) for 30 minutes. After removal from solution and removal of excess solution, the carrier was dried at 150° C. for 3 hours and then calcined at 500° C. for 2 hours.

The carrier supporting Ce and Rh was immersed in 500 cc of a mixed solution of chloroplatinic acid and palladium chloride (containing 0.64 g of Pt and 0.28 g of Pd) for 30 minutes. After removal from solution and removal of residual solution from the carrier, the carrier was rapidly dried in a hot draft of 150° C., reduced in a nitrogen atmosphere containing 5% hydrogen at 500° C. for 3 hours, and then calcined at 500° C. for 2 hours. The supported amounts of Ce, Rh, Pt and Pd were 0.1 mol, 0.10 g, 0.51 g and 0.22 g, respectively.

The catalysts obtained in Examples 1-12 and and Control Examples 1-5 were subjected to conditions for testing the durability and purifying ability of the same on exhaust gases.

1. Durability Test

A catalyst from each of the Examples and Control Examples was placed into a cylinder of stainless steel which served as an auto converter. The engine used in the test was a 6-cylinder, 2000 cc engine. The converter was connected to the exhaust pipe. The conditions were set as follows:

(1) Engine speed—2000 rpm
(2) Manifold vacuum—240 mm Hg
(3) Average ratio, A/F=14.53
(4) Catalyst bed temperature 650°-750° C.

The fuel was a commercial clear gasoline. Under these conditions the engine was run for 200 hours.

2. Conversion rate test

The purifying ability of each catalyst was determined using the 6-cylinder 2000 cc engine under the stated conditions. The converter gas temperature was 400° C. and the air/fuel ratio was variable. Exhaust gas was analyzed using NDIR (non-dispersed infrared spectrometer) for CO, FID (flame ionization detector) for HC and a chemi-luminescence meter for NOx.

Figure 2:
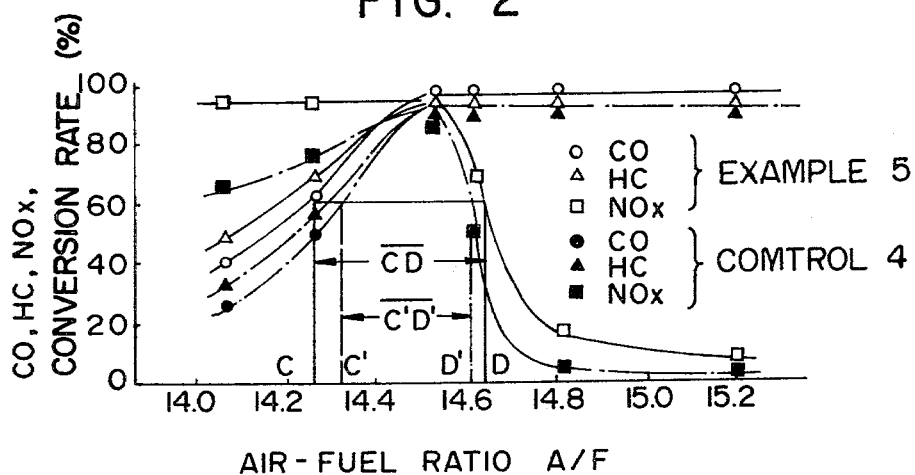
FIG. 2 is a diagram showing the purification performances of the catalysts obtained in Example 5 and Control Example 4.

The results of the measurements are summarized in Table 1.

lytic material (Examples 5-12) exhibit substantial conversion rates with high performance. For instance, even when the amount of Rh supported on the carrier is small compared with the catalysts in Control Examples, the former exhibits excellent purifying performance and durability. With respect to the catalysts of Examples 1 and 5 for purifying the exhaust gas and the conventional catalysts of Control Examples 1 and 4, the window of A/F values at which over 60% of said harmful elements, CO, HC, NOx, can be eliminated is shown in FIGS. 1 and 2. The window of the air/fuel ratio A/F at which more than 60% of all of the said three harmful components are eliminated are indicated by $\overline{AB}$, $\overline{A'B'}$ (FIG. 1) and $\overline{CD}$, $\overline{C'D'}$ (FIG. 2).

As is obvious from the figures, the window of the air/fuel ratio A/F ($\overline{AB}$, $\overline{CD}$) which can maintain the conversion rates of the present catalysts for purifying an exhaust gas according to the present invention at constant values are much wider than the ranges of the conventional catalyst ($\overline{A'B'}$, $\overline{C'D'}$). Accordingly, the present catalysts exhibit an excellent purification ability.

With respect to all of the catalysts in the Examples and Control Examples, the window of the air/fuel ratio over which more than 60% of the three harmful components are eliminated are examined and shown in Table 2.

TABLE 2

|   |   | Initial A/F window | A/F window after durability test |
|---|---|---|---|
| Example | 1 | 0.45 | 0.36 |
|  | 2 | 0.46 | 0.38 |
|  | 3 | 0.44 | 0.37 |
|  | 4 | 0.45 | 0.38 |
|  | 5 | 0.46 | 0.39 |
|  | 6 | 0.48 | 0.40 |
|  | 7 | 0.46 | 0.38 |
|  | 8 | 0.47 | 0.37 |
| Control | 1 | 0.36 | 0.12 |
|  | 2 | 0.38 | 0.14 |
|  | 3 | 0.34 | 0.10 |
|  | 4 | 0.37 | 0.33 |
|  | 5 | 0.42 | 0.35 |
| Example | 9 | 0.47 | 0.39 |
|  | 10 | 0.45 | 0.37 |
|  | 11 | 0.48 | 0.36 |
|  | 12 | 0.45 | 0.37 |

TABLE 1

|  |  | M | Supported amount of catalyst | | | | Initial Conversion rate % | | | Conversion rate after durability test % | | |
|---|---|---|---|---|---|---|---|---|---|---|---|---|
|  |  |  | Pt (g) | Pd (g) | Rh (g) | Ce (Mol) | Co | HC | NOx | CO | HC | NOx |
| Example | 1 | Ni | 0.72 |  | 0.04 |  | 96 | 94 | 95 | 94 | 92 | 92 |
|  | 2 | Mg | 0.51 | 0.22 | 0.03 |  | 97 | 95 | 96 | 94 | 93 | 93 |
|  | 3 | Fe |  | 0.71 | 0.05 |  | 96 | 94 | 94 | 93 | 91 | 91 |
|  | 4 | Mg | 0.50 | 0.23 | 0.03 |  | 95 | 93 | 93 | 93 | 91 | 91 |
|  | 5 | Zn | 0.76 |  | 0.04 | 0.1 | 96 | 95 | 95 | 95 | 93 | 93 |
|  | 6 | Mg | 0.51 | 0.22 | 0.03 | 0.1 | 98 | 96 | 96 | 95 | 94 | 94 |
|  | 7 | Sr. | 0.69 |  | 0.07 | 0.1 | 96 | 96 | 95 | 96 | 94 | 95 |
|  | 8 | Mg |  | 0.71 | 0.05 | 0.1 | 96 | 96 | 94 | 93 | 93 | 92 |
| Control | 1 |  | 0.72 |  | 0.04 |  | 95 | 93 | 93 | 89 | 87 | 72 |
|  | 2 |  | 0.51 | 0.22 | 0.03 |  | 96 | 94 | 94 | 91 | 89 | 78 |
|  | 3 |  |  | 0.71 | 0.05 |  | 95 | 93 | 93 | 89 | 85 | 67 |
|  | 4 |  | 0.69 |  | 0.10 | 0.1 | 96 | 94 | 94 | 93 | 91 | 90 |
|  | 5 |  | 0.51 | 0.22 | 0.10 | 0.1 | 97 | 95 | 95 | 94 | 92 | 91 |
| Example | 9 | Cu | 0.51 | 0.22 | 0.03 | 0.1 | 97 | 95 | 96 | 95 | 93 | 94 |
|  | 10 | Mn | 0.50 | 0.21 | 0.03 | 0.1 | 98 | 96 | 94 | 96 | 94 | 92 |
|  | 11 | Mo | 0.53 | 0.20 | 0.03 | 0.1 | 96 | 95 | 93 | 93 | 93 | 91 |
|  | 12 | Co | 0.51 | 0.20 | 0.03 | 0.1 | 97 | 94 | 95 | 94 | 91 | 91 |

Note: The conversion rate was measured under the air/fuel condition of (A/F) = 14.53.

As is obvious from Table 1, examination of the results shows that the conversion rate of the catalysts obtained from Examples 1-12 decreased very little even after the testing, whereas the conversion rate of the conventional catalysts obtained from Controls Examples 1-5 decreased substantially, particularly the conversion rate of NOx. The catalysts supporting both Ce and Rh as cata- Examination of the results shows that the ranges of the air/fuel ratio of the catalysts in the Examples are wider than window the catalysts of the Control Examples even in their initial stage, and the differences in the ranges between the former catalysts and the latter catalysts are even more remarkable. It is especially true that the catalysts supporting both Ce and Rh (Examples 5–7) exhibit wide air/fuel ratio window even after the durability test and have such a high performance that CO, HC and NOx are effectively purified on both the rich side and the lean side of the exhaust gas.

As is obvious from the above discussion, the catalyst for purifying exhaust gases of the present invention exhibits excellent results in its ability to purify an exhaust gas with high effieicncy of three harmful components CO, HC and NOx which are present in a given exhaust gas. The harmful CO, HC and NOx components present in the exhaust gas from an internal combustion engine which is driven under conditions in which the air/fuel ratio is within the range of 13.5 to 15.5 are purified all at one time.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A catalyst for purifying exhaust gas comprising:
    a catalyst carrier coated with a metal oxide material containing a spinel metal oxide of the formula: $MAl_2O_4$ wherein M is Sr, Cu, Mn, Mo, Zn, Fe, Co or Ni, said metal oxide coated carrier further being coated with Rh and Ce and Pt and/or Pd as the catalytically active components.

2. The catalyst of claim 1, wherein the profile of the catalyst carrier is a granular or monolithic shape and the material of said carrier is cordierite, mullite, $\alpha$-alumina, magnesia, zirconia, silicon carbide or silicon nitride.

3. The catalyst of claim 1, wherein the supported amounts of Ce, Rh, Pt and Pd, are 0.01–2.0 mol/l, 0.01–0.3 g/l, 0.05–5.0 g/l and 0.05–5.0 g/l respectively with the total supported amount of Rh, Pt and Pd being 0.1–5.0 g/l.

4. A process for manufacturing a catalyst for purifying exhaust gas, comprising:
    treating a spinel metal oxide of the formula $MAl_2O_4$, wherein M is Sr, Cu, Mn, Mo, Zn, Fe, Co or Ni, with an inorganic or organic acid;
    immersing a catalyst carrier in a slurry consisting of said treated spinel oxide and alumina sol stabilized with inorganic or organic acid, thereby forming a film comprising said spinel metal oxide on the surface of said carrier;
    washing said film coated carrier with water;
    drying and calcining said film coated carrier;
    immersing said calcined carrier in a solution containing a soluble form of Pt and/or Pd followed by the immersion of said carrier in a solution containing a soluble form of Rh; and
    calcining or reducing said noble metal coated carrier.

5. The process of claim 4, wherein said spinel metal oxide is prepared by mixing an oxide powder of metal M with alumina powder, firing the powdered mixture, washing said fired powder with an inorganic or organic acid and distilled water, thereby adjusting the water immersion pH of the oxide to 7–9, and then firing said oxide.

6. The process of claim 5, wherein the spinel metal oxide is a powder having an average particle size of 0.5–25$\mu$.

7. The process of claim 4, wherein the contents of the spinel metal oxide and alumina in the coating on said carrier are more than 90 weight % and less than 10 weight % respectively.

* * * * *